Oct. 31, 1944. W. R. TOMLINSON, JR 2,361,576
METHOD OF REFINING A CRUDE 1-NAPHTHYLACETIC ACID
Filed Dec. 12, 1941
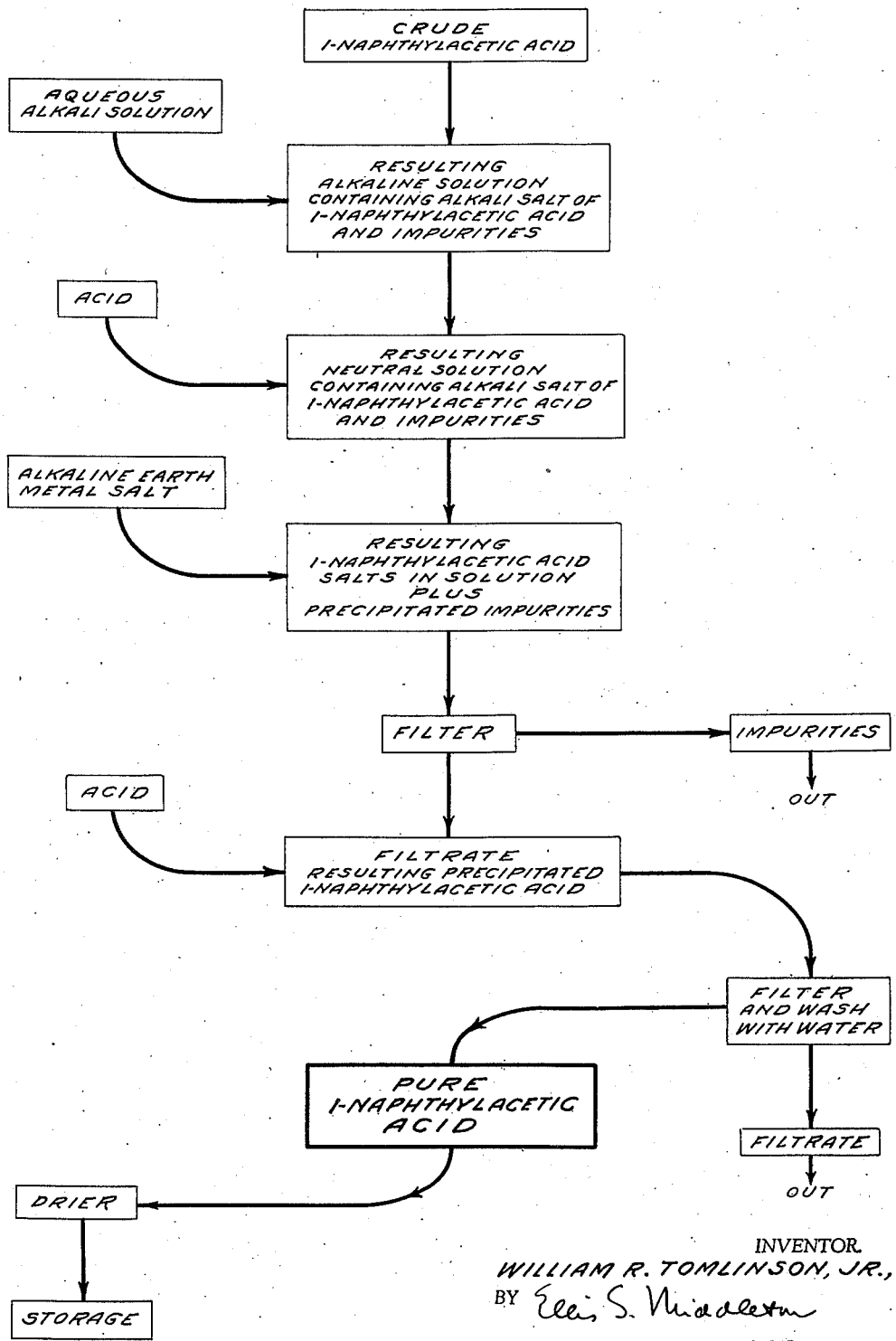
INVENTOR.
WILLIAM R. TOMLINSON, JR.,
BY Ellis S. Middleton
ATTORNEY.

Patented Oct. 31, 1944

2,361,576

UNITED STATES PATENT OFFICE 2,361,576

METHOD OF REFINING A CRUDE 1-NAPHTHYLACETIC ACID

William R. Tomlinson, Jr., Cos Cob, Conn., assignor to American Cyanamid Company, New York, N. Y., a corporation of Maine Application December 12, 1941, Serial No. 422,636

8 Claims. (Cl. 260—515)

The present invention relates to the refining of crude 1-naphthylacetic acid.

This chemical compound is one of the many substances including plant response. Its synthesis in the past has presented serious difficulties from the standpoint of purity of the product. Essentially, the processes have involved the production of 1-naphthyl acetonitrile. The nitrile is then hydrolyzed by the use of either a strong alkali or strong mineral acids to produce a crude 1-naphthylacetic acid. The product thus obtained is usually discolored and contaminated with impurities (probably a mixture of complex acids) which are difficult to remove.

The principal object of the present invention resides in a method of refining a crude 1-naphthylacetic acid wherein the product may be readily obtained substantially free from impurities and undesirable coloration.

Another important object is to provide 1-naphthylacetic acid in a substantially pure state by a method requiring only simple apparatus with high efficiencies.

These objects may be attained by dissolving a crude 1-naphthylacetic acid in an aqueous alkali solution, neutralizing the solution, adding a soluble salt of an alkaline earth metal to the solution, separating out the precipitated impurities, acidifying the solution and removing the thus precipitated purified 1-naphthylacetic acid.

Alkalies in aqueous solution which may be employed in dissolving the crude 1-naphthylacetic acid include those substances which produce a soluble salt of the 1-naphthylacetic acid in the solution, such as for example, the hydroxides and carbonates of ammonium and the alkali metals or the hydroxides of the alkaline earth metals.

When a crude 1-naphthylacetic acid is dissolved in an aqueous solution of an alkaline earth metal hydroxide and the resulting solution neutralized the impurities are precipitated, and the addition of an alkaline earth metal salt as indicated above may be omitted.

Acids which may be employed in neutralizing and acidifying the solution include those which are more soluble in the solution than the 1-naphthylacetic acid, such as for example hydrochloric, sulphuric, phosphoric, nitric or acetic.

Referring to the accompanying flow sheet, a preferred method of carrying out the invention comprises dissolving a quantity of the crude 1-naphthylacetic acid in 5% aqueous sodium hydroxide solution. The solution is made neutral by the addition of dilute hydrochloric acid (1 part of concentrated acid to 2 parts of water). A sufficient quantity of a 5% aqueous solution of calcium chloride is added to precipitate impurities. The mixture is filtered and the impurities discarded. The filtrate is acidified with dilute hydrochloric acid. The precipitated 1-naphthylacetic acid is removed by filtration, washed with water and dried.

Any suitable concentration of the alkali or the alkaline earth metal salt solution may be employed. However, when the more concentrated solutions are used it has been found advantageous to dilute with water when precipitating the impurities as the latter are thrown out more completely from a dilute aqueous solution.

The invention will be described in further detail in the following specific examples.

Example 1

250 g. of discolored crude 1-naphthylacetic acid are dissolved in an alkali solution prepared by dissolving 55 g. of sodium hydroxide in 2500 cc. of water. The resulting solution is adjusted to a pH of about 7.0 by the addition of dilute hydrochloric acid (1 part concentrated acid to 2 parts water). 175 cc. of a 5% aqueous solution of calcium chloride are added. The precipitated impurities are filtered off and discarded. A small portion of the filtrate is further tested for impurities by adding the calcium chloride solution. The 1-naphthylacetic acid is freed by the addition of slightly more than the equivalent quantity of hydrochloric acid. The precipitated 1-naphthylacetic acid is filtered off, washed with water and dried in an oven at 80° C. The product is a white crystalline material of 99.5% purity, melting at 131 to 133° C.

Example 2

200 g. of discolored crude 1-naphthylacetic acid are dissolved in an alkali solution prepared by dissolving 44 g. of sodium hydroxide in 2000 cc. of water. The resulting solution is adjusted to a pH of about 7.0 by the addition of dilute hydrochloric acid (1 part concentrated acid to 2 parts water). 300 cc. of a 5% aqueous solution of barium chloride are added. The precipitated impurities are filtered off and discarded. The 1-naphthylacetic acid is freed by the addition of slightly more than the equivalent quantity of hydrochloric acid. The precipitated 1-naphthylacetic acid is filtered off, washed with water and dried in an oven at 80° C. The product is a white crystalline material of 99.2% purity, melting at 131–132.4° C.

Any salt of an alkaline earth metal may be employed in this invention which is of sufficient solubility in the neutral aqueous solution of crude 1-naphthylacetic acid to effect precipitation of the impurities therein.

In comparison with known methods of purification such as, for example, repeated crystallization from water or organic solvents plus treatment with a decolorizing agent, the novel method herein described is effective in removing both the impurities and undesirable coloring matter. It is a simple inexpensive method which provides a product of a high degree of purity.

While the invention has ben described with reference to specific embodiments, it is to be understood that it is not to be limited thereto but is to be construed broadly and restricted solely by the scope of the appended claims.

I claim:

1. In a method of removing impurities from an aqueous solution of a salt of 1-naphthylacetic acid and also containing precipitable impurities, that improvement which includes precipitating said impurities by means of a water soluble alkaline earth metal salt and removing precipitated impurities from the solution.

2. A method of refining crude 1-naphthylacetic acid which comprises dissolving the crude acid in an aqueous solution of an alkali, neutralizing the solution, adding a soluble salt of an alkaline earth metal to the solution, separating out the precipitated impurities, acidifying the solution and recovering the thus precipitated purified 1-naphthylacetic acid.

3. Method of claim 2 wherein the solution is neutralized to a pH of approximately 7.

4. Method of claim 2 further characterized in that the alkaline earth metal salt is added as an aqueous solution.

5. A method of refining crude 1-naphthylacetic acid which comprises dissolving the crude acid in an aqueous solution of an alkali metal hydroxide, neutralizing the solution by means of hydrochloric acid, adding a soluble salt of an alkaline earth metal to the solution, separating out the precipitated impurities, acidifying the solution by means of hydrochloric acid and recovering the thus precipitated purified 1-naphthylacetic acid.

6. A method of refining crude 1-naphthylacetic acid which comprises dissolving the crude acid in an aqueous solution of an alkaline earth metal hydroxide, neutralizing the solution, separating out the precipitated impurities, acidifying the solution and recovering the thus precipitated purified 1-naphthylacetic acid.

7. A method of refining crude 1-naphthylacetic acid which comprises dissolving the crude acid in an aqueous solution of an alkali metal hydroxide, neutralizing the solution by means of hydrochloric acid, adding calcium chloride to the solution, separating out the precipitated impurities, acidifying the solution by means of hydrochloric acid and recovering the thus precipitated purified 1-naphthylacetic acid.

8. A method of refining crude 1-naphhylacetic acid which comprises dissolving the crude acid in an aqueous solution of sodium hydroxide, neutralizing the solution by means of hydrochloric acid, adding calcium chloride to the solution, separating out the precipitated impurities, acidifying the solution by means of hydrochloric acid and recovering the thus precipitated purified 1-naphthylacetic acid.

WILLIAM R. TOMLINSON, JR.